US012127642B2

(12) United States Patent
Einhorn

(10) Patent No.: US 12,127,642 B2
(45) Date of Patent: Oct. 29, 2024

(54) QUICK-RELEASE SYSTEM FOR A WATCH BRACELET

(71) Applicant: Glashütter Uhrenbetrieb GmbH, Glashütte/Sachsen (DE)

(72) Inventor: Sebastian Einhorn, Dresden (DE)

(73) Assignee: GLASHÜTTER Uhrenbetrieb GmbH, Glashütte/Sachsen (DE)

( * ) Notice: Subject to any disclaimer, the term of this patent is extended or adjusted under 35 U.S.C. 154(b) by 411 days.

(21) Appl. No.: 17/493,976

(22) Filed: Oct. 5, 2021

(65) Prior Publication Data

US 2022/0202147 A1 Jun. 30, 2022

(30) Foreign Application Priority Data

Dec. 30, 2020 (EP) .................................... 20217851

(51) Int. Cl.
*A44C 5/14* (2006.01)
*G04B 37/14* (2006.01)

(52) U.S. Cl.
CPC ................ *A44C 5/145* (2013.01); *A44C 5/14* (2013.01); *A44C 5/147* (2013.01); *G04B 37/1486* (2013.01)

(58) Field of Classification Search
CPC ....... Y10T 24/4718; A44C 5/147; A44C 5/14; A44C 5/145; G04B 37/1486; G04B 37/16
See application file for complete search history.

(56) References Cited

U.S. PATENT DOCUMENTS

2018/0011448 A1 1/2018 Von Allmen
2018/0294554 A1* 10/2018 Xu ......................... G04G 17/04
2020/0142358 A1* 5/2020 Taniguchi ................ A44C 5/14
2020/0383434 A1* 12/2020 Chung ................. A44C 5/0053
2023/0141715 A1* 5/2023 Christian ........... G04B 37/1493
368/282

FOREIGN PATENT DOCUMENTS

| | | | |
|---|---|---|---|
| CN | 107581725 | A | 1/2018 |
| CN | 111134428 | A | 5/2020 |
| EP | 3 266 333 | A1 | 1/2018 |
| EP | 3 266 333 | B1 | 5/2019 |
| FR | 2 754 434 | A1 | 4/1998 |
| JP | 2018-950 | A | 1/2018 |
| JP | 2020-74841 | A | 5/2020 |

OTHER PUBLICATIONS

European Search Report for EP 20 21 7851 dated Jun. 16, 2021.

* cited by examiner

*Primary Examiner* — Robert Sandy
*Assistant Examiner* — Michael S Lee
(74) *Attorney, Agent, or Firm* — Sughrue Mion, PLLC

(57) ABSTRACT

An end link for securing a watch strap on a watch case including a connecting piece of a wristband, the watch case having a pin. The case has a longitudinal slot delimited by two support surfaces parallel to a main plane. The connecting piece has a lateral face which includes a guiding groove arranged to cooperate in a complementary manner with the pin, and the connecting piece has a lock with a slide catch arranged to cooperate with the slot in a locking position, towards which the slide catch is moved by elastic return belonging to the lock. There is unlocking portion arranged to be operated directly by a user to move the slide catch away from said slot of the case. The guiding groove is curved so that the slide catch is firmly maintained against one of the two surfaces in the locking position.

10 Claims, 3 Drawing Sheets

QUICK-RELEASE SYSTEM FOR A WATCH BRACELET

CROSS REFERENCE TO RELATED APPLICATION

This application claims priority to European Patent Application No. 20217851.3 filed Dec. 30, 2020, the entire contents of which are incorporated herein by reference.

FIELD OF THE INVENTION

The invention relates to a to a quick-release system for a watch strap on a watchcase, in particular a metallic watch strap, or leather or rubber for example.

BACKGROUND OF THE INVENTION

There are known devices for the securement of a watch strap on a watchcase, for example from EP2229836 which discloses a quick-release system using a spring bar in combination with a rotatable lever, in which the connecting element is pushed onto the spring bar from above. However, the use of a spring bar severely limits the implementation of a locking system. It is also known from EP1128237A1 and EP3266333A1 quick-change systems that have a milling on the underside of the lugs, into which an interchangeable connecting piece is pushed. The locking mechanism is implemented in the first solution by means of a pivotable lever, in the second variant with a pusher that moves a slide when pressed. Since a clearance fit is necessary for assembly, a gap can occur between the bracelet and the case, especially when the bracelet is under tension, as is the normal condition when wearing a watch. It should also be noted that the connecting element is mounted from the underside of the watch and thus in the usual load direction that occurs when a watch is worn. The locking element must therefore absorb a large portion of the forces that occur.

SUMMARY OF THE INVENTION

It is an object of the invention to overcome these drawbacks in proposing a quick-release system with a matchless fit of a connection piece in which the locking element is subjected to little stress and which offers a high level of security. An invisible fastening in the assembled state and a low height requirement are also to be made possible.

Hence, the invention relates to a device for securing a watch strap on a watch case comprising an end link for securing a watch strap on a watch case comprising an connecting piece of a wristband for a watch, said watch case comprising at least one pin, wherein said watchcase comprises a longitudinal slot delimited by two main support surfaces parallel to a main plane PP and said connecting piece comprises at least one lateral face, which itself comprises for its fixture to said case at least one guiding groove arranged to cooperate in a complementary manner with said pin, and said connecting piece comprises at least one lock, wherein said lock comprises a slide catch arranged to cooperate with said slot in a locking position, towards which said slide catch is moved by elastic return means belonging to said lock, this comprising unlocking means arranged to be operated directly by a user to move said slide catch away from said slot of said case, characterised in that said guiding groove is curved guiding groove so that the slide catch is firmly maintain against one of the two main surface of the longitudinal slot in locking position.

According to other features of the invention:

- the curved guiding groove comprises a first straight portion opening on the front face of the end link;
- the two main support surfaces of said case comprise an upper support surface and a lower support surface, the upper one being longer than the lower one;
- the end link comprises a cover for a front guide of said slide catch, and in that it comprises a guiding chamber of said slide catch and for receiving elastic return means;
- the cover is fixed to said end link by at least one spring-loaded pin;
- the slide catch is guided in at least one first guide belonging to said guiding chamber;
- the unlocking means comprise a pushbutton, which is arranged to move in a complementary opening belonging to said cover;
- the pushbutton is going through the said opening of the cover;
- the slide catch comprises a head cooperating with said slot, said head comprising a slope arranged to cooperate with one of the two main support surface;
- the cover is guided in a third guide belonging to said end piece.

BRIEF DESCRIPTION OF THE DRAWINGS

Other features and advantages of the present invention will appear more clearly upon reading the following detailed description, made with reference to the annexed drawings, given by way of non-limiting and in with.

DETAILED DESCRIPTION OF THE PREFERRED EMBODIMENTS

Figure 1A:
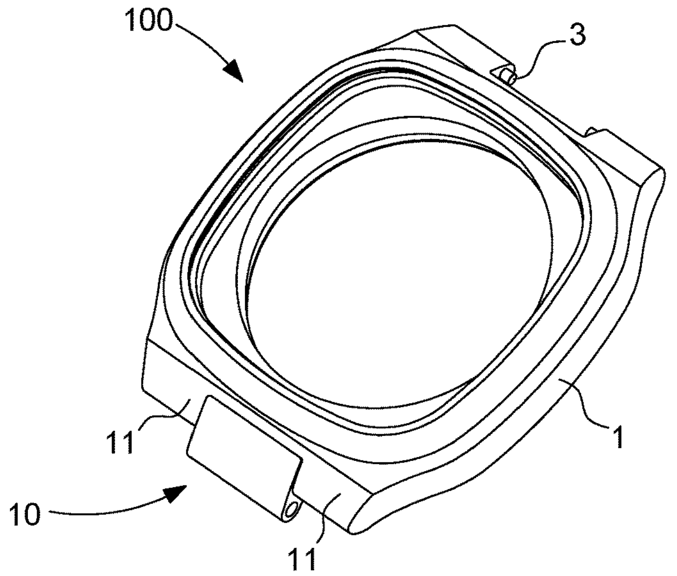
FIG. 1*a* is a perspective view from the top of a watch equipped with a quick-release system according to the invention.
Figure 1B:
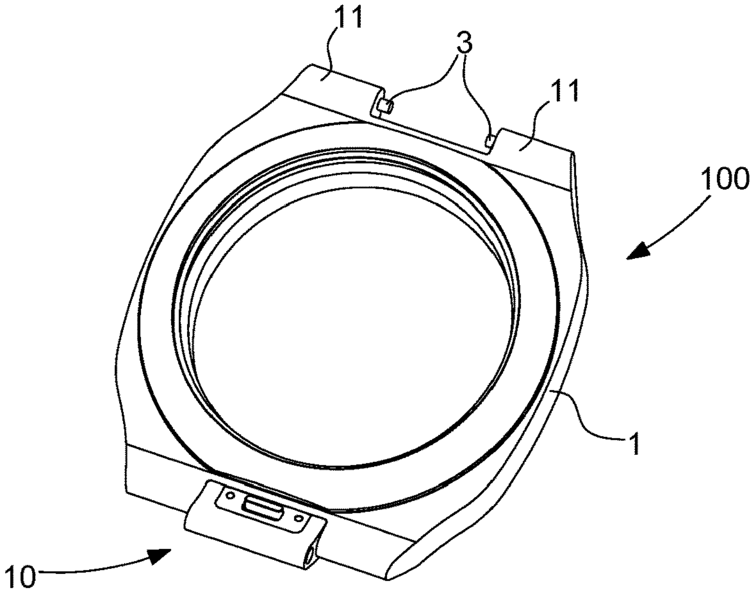
FIG. 1*b* is a perspective view from the bottom of a watch equipped with a quick-release system according to the invention.
Figure 1C:
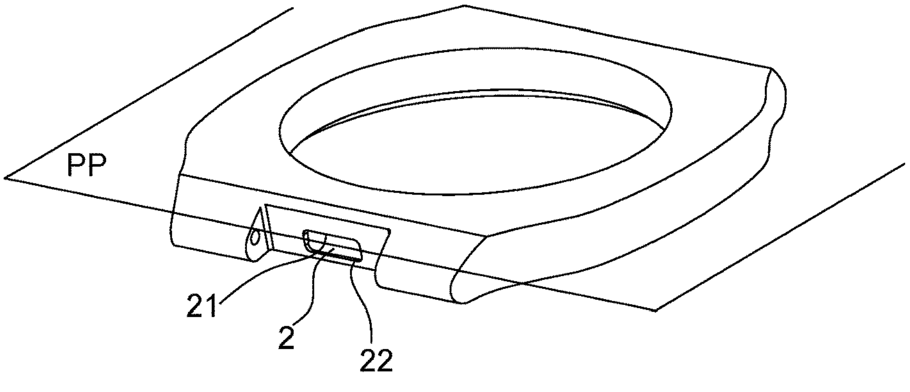
FIG. 1*c* is a perspective view of a watch without a quick-release system according to the invention.
Figure 2A:
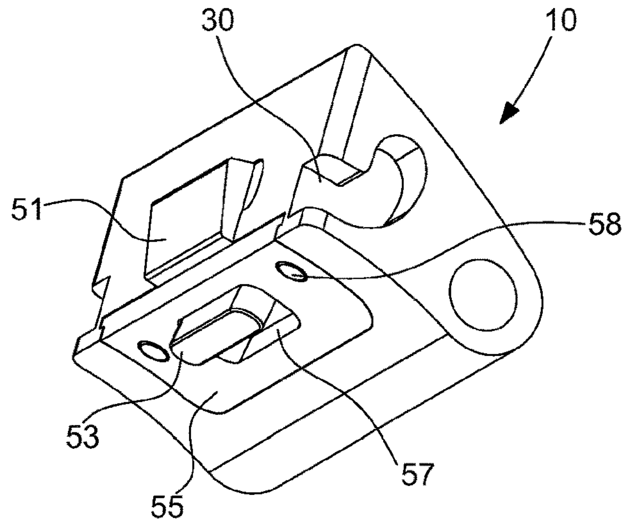
FIG. 2*a* is a perspective view of a quick-release system according to the invention.
Figure 2B:
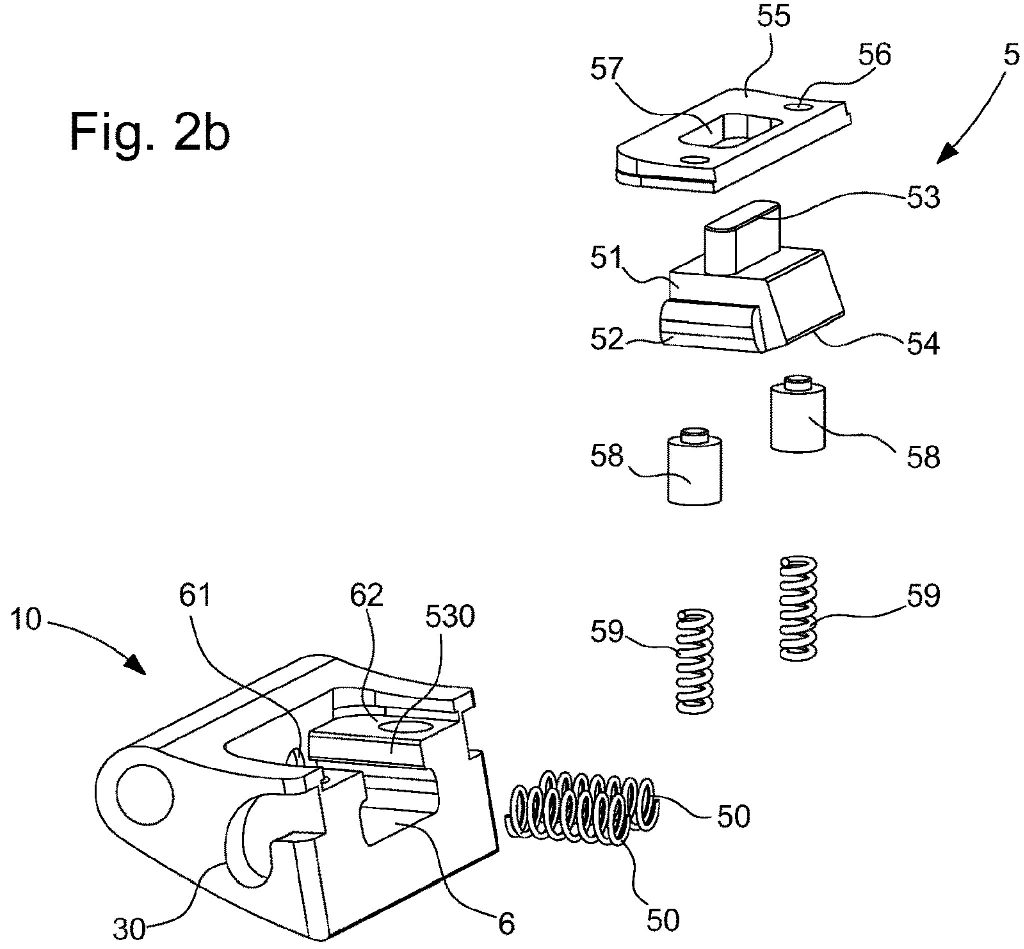
FIG. 2*b* is an exploded view of a quick-release system according to the invention.
Figure 3A:
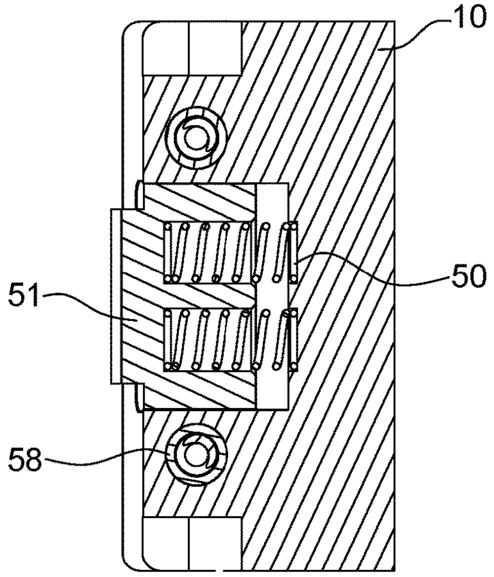
FIGS. 3*a* and 3*b* are cross-section view of a quick-release system according to the invention.
Figure 3B:
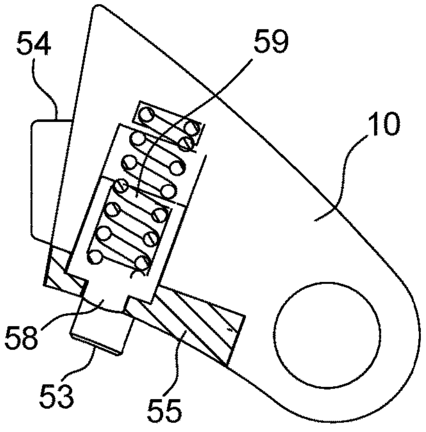

The invention proposes to give the user the possibility of easily and securely changing the wristband fitted to his/her watch with the least possible alteration to the watch case from a respective collection in order to retain the appearance of the front face and the rim of the watch, and also proposes a watch with interchangeable wristband for the lowest possible differential production cost.

It must be possible to change the wristband without any tool and without delicate handling while allowing a fast change between a leather wristband and a linked metal wristband, for example, or also allowing the wristband to be matched to items of clothing and/or jewelry worn by the user or to the complexion of the user, in accordance with the circumstances of use of the watch. The interchangeable wristband also enables wristbands of different length to be exchanged instantaneously, which allows retailers and dealers to immediately supply their customers with perfectly suited watches.

The invention also consists in using an interface connection between the watchcase and in particular, but not restrictively, the middle part, on the one hand, and the ends of the wristband, on the other. The invention is described more precisely here for the preferred case of watch band end links, which can be produced in series at a manageable cost and need only be joined to a wristband body, but it is also possible to choose a configuration of wristband in a single piece without a separate end piece, and including the functionalities of interchangeability and locking necessary for good function, but naturally at a higher cost price. The person skilled in the art will know how to adapt the arrangement described below for an end link to an entire wristband without the least problem.

The invention thus preferably relates to a watch band end link 10 for a wristband 9 for the removable fitting of a case 1 of a watch 100.

To receive such a link 10, this case 1 comprises two pins 3 or studs or similar belonging to the case 1, the two pins 3 being inserted into corresponding bores, either by gluing, pressing or soldering, and the bores being drilled perpendicular to the 6H-12H axis of the case from the inner faces the horn 11. These pins 3 are arranged to cooperate in a complementary manner with a guiding groove 30 machined in the lateral face of the end link 10.

Each pin 3 is preferably carried by a reinforced zone of the case 1, in particular a horn. The connection between each pin 3 and each horn must have sufficiently broad dimensions to absorb stresses, in particular traction, torsion and accelerations experienced by the wristband and the case 1. The simple insertion of the end link 10 onto this pins 3, which are preferably symmetrical in relation to a plane of symmetry, ensures the interchangeability of the wristbands 9 in relation to the case 1. Similarly, the removal must be designed so that no hindrance is encountered.

To assure the safety function and the insertion of a locking mechanism of the end link 10 when the pins 3 are in an abutment position in the guiding grooves 30, the mechanism comprises a system for locking and unlocking.

For this, the end link 10 has a particular machined structure, as can be seen from the particular non-restrictive variant illustrated by the figures.

This particular machined structure preferably comprises at least a longitudinal slot 2, which is delimited by two main support surfaces 21, 22 parallel to a main plane PP, the two main support surfaces 21, 22 comprising an upper support surface 21 and a lower support surface 22, the upper one being longer than the lower one. Of course, surfaces 21 and 22 may have the same length without preventing the slot 2 from maintaining the slide catch.

Such a slot 2 having two parallel faces is very easy to make by turning or by milling. It is preferably located between the horns 11 of the case 1, as can be seen in the figures, and is invisible when the link 10 or the wristband 9 is in place. Therefore, for implementation of the invention, it is sufficient that the case 1 comprises the slot 2 and the pins 3. No other component is necessary at the level of the case 1 that can thus retain all its purity of shape and its usual use.

Advantageously, the vertical face between the lugs is angled so that the connecting piece 10 follows the natural shape of the wrist. The slot 2 is milled parallel to the PP surface in order to be as easy to manufacture as possible.

To assure the locking function, the link 10 comprises at least one lock 50. This lock 5 comprises a slide catch 51, which is arranged to cooperate in a complementary manner and with minimal play with the slot 2 in a locking position, towards which the slide catch 51 is moved by elastic restoring means 50 belonging to the end link 10. Moreover, the end link 10 comprises unlocking means arranged to be operated directly by a finger of a user to move said slide catch 51 away from said slot 2 of said case 1. Therefore, no tool is necessary to either perform the unlocking or the locking or to perform the insertion or the removal of the link 10 into or from the case 1.

According to the invention, the guiding grooves are curved guiding groove so that the slide catch 51 is firmly maintain against one of the two main surface 21, 22 of the longitudinal slot 2 in locking position.

In this regard, while the invention is described in its preferred form where the end link 10 comprises a male part (the slide catch 51) cooperating with a female part (slot 2) of the case 1, the reverse configuration is possible without departing from the invention.

More particularly, as illustrated, the slide catch 51 comprises a head 54 cooperating with said slot 2, the head 54 comprising a slope arranged to cooperate in abutment with one of the main support surfaces 21, 22 of the slot 2 of the case 1, in which the head 54 preferably runs with minimal play.

According to the invention, the end link 10 comprises a guiding chamber 6 to receive the said slide catch 51 and for receiving elastic return means 50, and a cover 55 forming a front guide of said slide catch 5, the cover being sled into the end link 10 from the side facing the case 1 thanks to its lateral edges which are guided in a third guide 62 belonging to said end piece 10.

In the figures the slide catch 51 is guided with on main guide 530 and two secondary grooves belonging to the end link and cooperating with two guiding surfaces 52 of the slide catch 51. The slide catch 51 is installed from the side facing the case by pushing it into the guiding chamber at the front.

The cover 55 protects the slide catch 51, and since it is scarcely visible from the outside, it can be made from a less precious material that is more resistant to wear such as steel or similar than the material forming the end link 10, which is an external appearance part having a design in harmony with that of the case 1 and often of the same material and with the same finish, wherein this end link 10 can be made from a gold alloy or similar, for example.

The end link 10, or indeed the locking means, also has a back guide chamber 61 which assures reception of the elastic restoring means 50 illustrated in a non-restrictive manner by spiral springs.

More particularly, the cover 55 is fixed to the end link 10 by at least one spring-loaded pin 58, which spring in a counterbore on the hidden side of the cover, thus eliminating the last degree of freedom. It is possible to disassemble the cover by simply pressing on the heads of the two pins for the purpose of cleaning.

For its operation, according to the invention, the lock 50 preferably comprises a pushbutton 53, which is arranged to be operated by a finger of a user to control an unlocking of the locking means by retraction of the slide catch 51 by an application of pressure to this pushbutton 53.

In an advantageous configuration, the cover 55 comprises an opening 57 which is arranged to receive the pushbutton 53, said pushbutton going through and sliding in the said opening 57 of the cover 55.

Figure 4A:
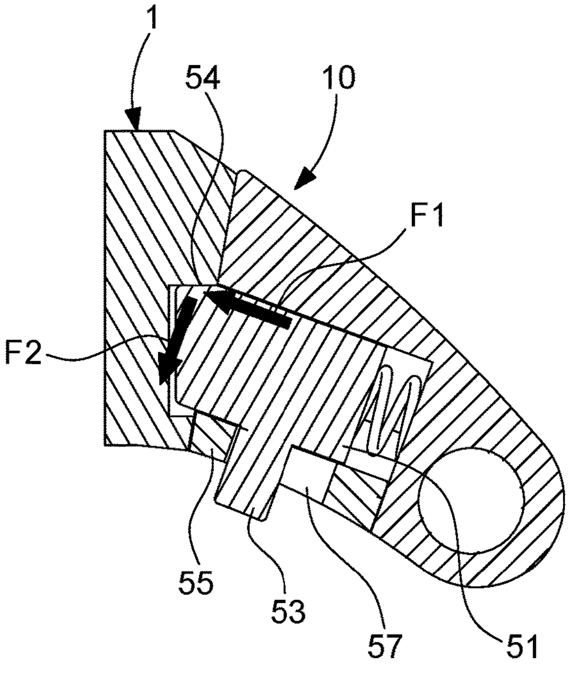
FIGS. 4*a* and 4*b* are cross-section view of a watch equipped with a quick-release system according to the invention.
Figure 4B:
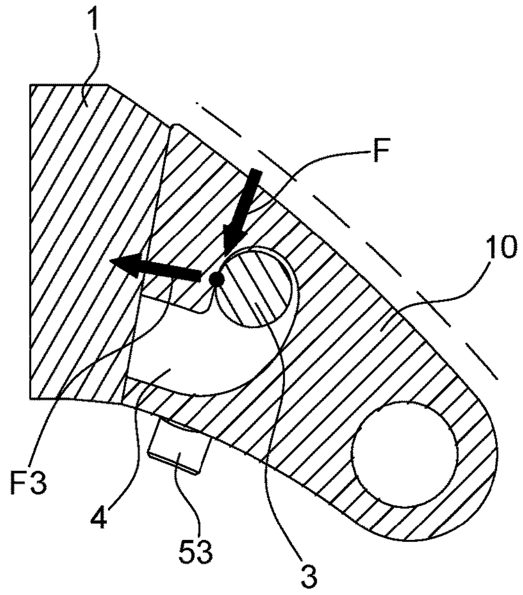

As illustrated in FIGS. 4*a* and 4*b*, the end link has a slope 54, which is parallel to the upper support surface 22 of the case 1. Due to the spring force F1 of the springs 50, the slope 54 of the head of the slide catch is pressed against the surface 22 and thus snaps into place. As a result of the slope, the force F2 acts on the slide catch 51 and thus on the end link 10 itself by pressing it in the direction of the underside of the case 1. The connecting piece is pressed against the case 1 with the force F3, whereby a gapless fit is possible.

The disassembly of the system is made by pulling the pushbutton 53 and the head of the slide catch 51 slides out of the slot 2 in the case, thus making it possible to guide the pins 3 along the curved guiding grooves and detach the end link 10 from the case 1. The assembly is carried out by again guiding the pins 3 along the curved guiding grooves until the head of the slide catch snaps into the slot 2 and until the initial state is restored and the end link is attached to the case 1.

The invention also relates to a watch 100 comprising a watch case 1, which to receive at least one said link 10 comprises at least one secondary transverse slot, wherein said case 1 comprises a longitudinal slot 2 delimited by two main support surfaces 21, 22 parallel to a main plane PP, characterised in that said watch 100 comprises at least one wristband end link 10 arranged to cooperate for insertion and locking to said case (1).

More particularly, the watch 100 comprises at least one removable wristband 9, which at each of its two ends has such a removable end link 10, wherein the links 10 are arranged on both sides of the watch case or jewel setting 1.

More particularly the watch 100 comprises a plurality of such interchangeable removable wristbands 9.

The invention claimed is:

1. A device for securing a watch strap on a watch case, the device comprising the watch case and the watch strap, wherein the watch strap includes an end link for securing the watch strap on the watch case, wherein said watch case comprising at least one pin and has a longitudinal slot delimited by two main support surfaces parallel to a main plane, wherein said end link comprises at least one lateral face, which comprises for fixture to said watch case at least one guiding groove arranged to cooperate in a complementary manner with said pin, and said end link comprises at least one lock, wherein said lock comprises a slide catch arranged to cooperate with said longitudinal slot in a locking position, towards which said slide catch is moved by elastic return means belonging to said lock, and comprising unlocking means arranged to be operated directly by a user to move said slide catch away from said longitudinal slot of said watch case, and wherein said guiding groove is a curved guiding groove so that the slide catch is firmly maintained against one of the two main surface of the longitudinal slot in the locking position.

2. The device according to claim 1, wherein the curved guiding groove comprises a first straight portion opening on the front face of the end link.

3. The device according to claim 1, wherein the two main support surfaces of said watch case comprise an upper support surface and a lower support surface, the upper one being longer than the lower one.

4. The device according to claim 1, wherein the end link further comprises a cover for a front guide of said slide catch, and a guiding chamber of said slide catch and for receiving elastic return means.

5. The device according to claim 4, wherein said cover is fixed to said end link by at least one spring-loaded pin.

6. The device according to claim 4, wherein said slide catch is guided in at least one first guide belonging to said guiding chamber.

7. The device according to claim 1, wherein said unlocking means comprise a pushbutton, which is arranged to move in a complementary opening belonging to said cover.

8. The device according to claim 7, wherein the said pushbutton is going through the said opening of the cover.

9. The device according to claim 1, wherein the slide catch comprises a head cooperating with said slot, said head comprising a slope arranged to cooperate with one of the two main support surface.

10. The device according to claim 1, wherein said cover is guided in a third guide belonging to said end piece.

* * * * *